Oct. 28, 1969    W. W. BUCHMAN    3,475,077
METHOD AND SYSTEM FOR ADJUSTING THE PHASE
RELATIONSHIPS OF RADIATION
Filed Aug. 4, 1965

INVENTOR.
WILLIAM BUCHMAN
BY
Elliott & Pastoriza
ATTORNEYS

United States Patent Office 3,475,077
Patented Oct. 28, 1969

3,475,077
METHOD AND SYSTEM FOR ADJUSTING THE PHASE RELATIONSHIPS OF RADIATION
William W. Buchman, Los Angeles, Calif., assignor to Union Carbide Corporation, a corporation of New York
Filed Aug. 4, 1965, Ser. No. 477,164
Int. Cl. G02f 1/26
U.S. Cl. 350—150                                                6 Claims

ABSTRACT OF THE DISCLOSURE

A giant pulse laser system of the type employing an electro-optical retarder or cell as a Q-spoiling means is provided with a roof prism for one of the end mirrors in the cavity. The problem of a phase shift, as radiation is refracted in the roof prism, is overcome in accord with the present invention by adjusting the initial direction of polarization relative to a reference axis in the electro-optical retarder and by also adjusting the voltage applied to the electro-optical retarder to compensate for this phase shift so that when the shutter is closed the returning radiation is polarized orthogonally to the initial radiation and yet when zero voltage is applied to the electro-optical retarder, it is in its maximum "open" condition to transmit radiation.

---

This invention relates generally to optical systems and more particularly to an improved method and system of adjusting the phase relationships of radiation passing through an electro-optical shutter or retarder and returning back through said retarder after being totally internally reflected by a refracting medium.

The method and system finds its preferred application in giant pulse laser systems in which a Q-spoiling means in the form of a Kerr or Pockels cell is employed in the optical cavity of the system. For convenience of illustrating one embodiment of the invention, its use in a giant pulse laser system will be set forth.

In co-pending United States patent application Ser. No. 433,671, filed Feb. 18, 1965, and entitled Laser System with Phase Shift Compensation, there is described the use of a refracting medium in the form of a roof prism as a substitute for one of the optically flat totally reflecting end mirrors in the optical cavity of a giant pulse laser system. By utilizing a roof prism, total reflection of the laser radiation in the cavity can be achieved and damaging of the sensitive dielectric coatings formed on the heretofore normally used flat mirror avoided.

As pointed out in the co-pending application, the use of the roof prism introduces a phase shift in the radiation which must be compensated for by changing the normal retardation or phase shift occurring in the Kerr or Pockels cells in order that complete opening or complete closing of the cell can be effected.

The problem is solved, as described in the co-pending application, by orienting the direction of the apex of the roof prism at 45° to the direction of polarization established in the electro-optical shutter or retarder. Suitable opening and closing voltages are then applied to the shutter which will vary the retardation in such a manner as to compensate for the phase shift occurring in the roof prism.

While the foregoing compensation provides a solution to the problem of compensating for the phase shift occurring in the roof prism, certain other difficulties are introduced.

First, with the use of two voltages applied to the Kerr or Pockels cell, there will be an electric field in the cell when in open as well as closed condition. As a consequence, a space charge can build up in the cell solution which will adversely affect its action.

Second, with two power supplies necessary, the electronics for effecting a switching between open and closed conditions becomes awkward and expensive, particularly when synchronizing the switching with light pump pulses for the laser.

With the foregoing considerations in mind, it is a primary object of the present invention to provide an improved system in which phase shift in a refracting medium employed in combination with an electro-optical retarder is compensated for without requiring two power supplies.

More specifically, it is an object to provide a method and system for adjusting the phase relationship between initial radiation polarized in a given direction by a polarizing means and passed through an electro-optical retarder, and return radiation derived from said initial radiation passing back through the retarder after being totally internally reflected by a refracting medium such as a roof prism, in a manner, first, such that the return radiation is not attenuated in the polarizing means when zero or no voltage is applied to the retarder, and, second, the return radiation is attenuated in the polarizing means to a maximum degree when a given voltage is applied to the retarder.

Still another object of this invention is to provide a laser system incorporating a Kerr or Pockels type cell or other electro-optical retarder utilizing phase shifting and polarizing means for effecting attenuation together with an end reflecting means in the form of an internally reflecting prism, without the disadvantage heretofore occurring as a result of phase shift in the prism, all to the end that the use of a dielectric coated end mirror and the possible damage thereto in one end of the optical cavity of the system is avoided.

Briefly, these and other objects and advantages of this invention are attained in a system utilizing a roof prism and electro-optical retarder by initially orienting the direction of the apex of the roof prism either perpendicular or parallel to the given direction of polarization of radiation passed through the retarder. By direction of polarization as used herein and in the claims is meant the direction of vibration of the electric vector of the polarized radiation. It is known that linearly polarized light reflected from a roof prism will become elliptically polarized unless the orientation of apex of the prism is either perpendicular or parallel to the direction of polarization. With such initially established orientation, it will be clear that when zero voltage is applied to the Kerr or Pockels cell or other equivalent electro-optical retarder, so that no retarding effects occur in the electro-optical shutter, the returning radiation from the roof prism will lie in the same direction as the initial radiation from the polarizing means. As a result, there will be 100 percent transmission through the electro-optical shutter when zero or no voltage is applied thereto in accordance with a first desirable feature of this invention.

In addition to the above-described orientation between the roof prism apex and the given direction of polarization, there are effected two further adjustments. First, the given direction of polarization, and thus the apex of the roof prism in view of its fixed relationship to the direction of polarization, is adjusted to form a given angle with respect to a reference axis which, in the case of a Kerr cell, corresponds to the direction of the electric field established between the cell plates as a consequence of voltage applied thereto. Second, the actual voltage applied to the electro-optical retarder is adjusted to a given voltage such that both the given angle and the given voltage will result in returning radiation from the roof prism passing back through the retarder being polarized orthogonally to the given direction of polarization to thereby effect the desired maximum attenuation.

Thus, the desired end result of complete attenuation under application of a single given voltage is realized with complete transmission when no or zero voltage is applied.

A better understanding of the method and system of this invention will be had by now referring to the accompanying drawings, in which.

Figure 1:
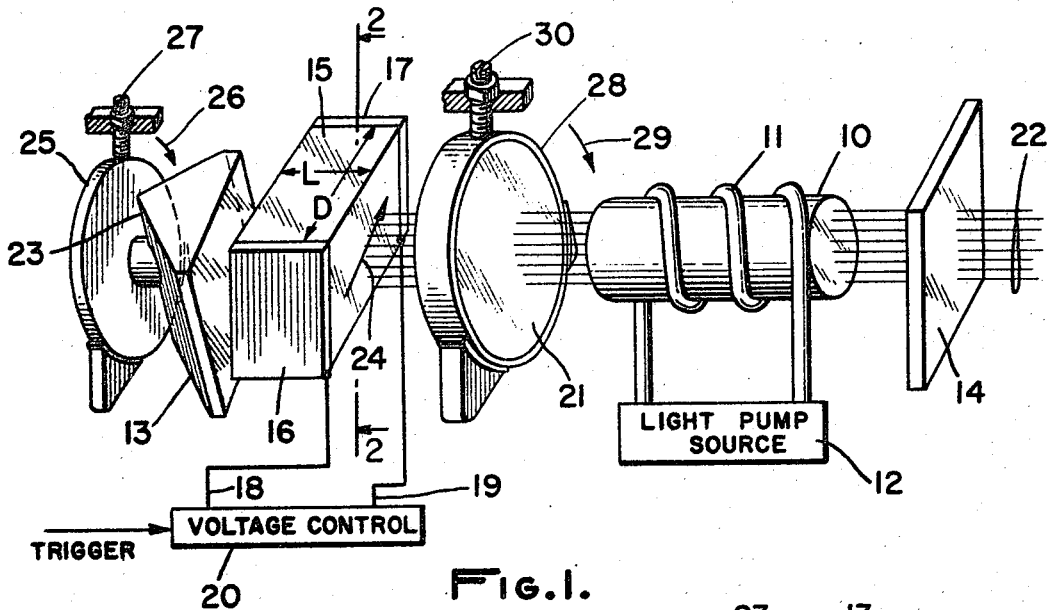
FIGURE 1 is a highly schematic perspective view of a giant pulse laser system incorporating the method and optical system of this invention.

Referring first to FIGURE 1, there is illustrated a laser material 10 which, by way of example, may constitute a ruby rod, surrounded by a helical flash lamp 11 connected to a suitable light pump source 12. End reflecting means in the form of a "roof prism" 13 and partially reflecting mirror 14 are disposed adjacent to opposite sides of the laser rod 10, as shown, to define an optical cavity for effecting stimulated emission of radiation. In accordance with the present invention, the prism 13 serves as a substitute for the normally provided 100 percent reflecting end mirror, the prism itself effecting internal reflection by functioning as a refracting medium so that the danger of destruction of the multi-layer dielectric coating on an optically flat type end mirror is avoided.

As shown in FIGURE 1, an electro-optical retarder such as a Kerr cell 15 is provided in the optical cavity and includes electrodes in the form of plates 16 and 17 connected through leads 18 and 19 to a voltage control means 20. A polarizing means 21 cooperates with the retarder 15 for polarizing light from the laser material in a given direction.

The end mirror 14 in FIGURE 1 is partially reflective, for example, 35 percent reflecting, and partially transparent so that the laser generated radiation may be coupled out of the system as indicated at 22.

The apex of the roof prism 13 in FIGURE 1 is indicated at 23 and the direction of polarization of radiation effected by the polarizer 21 is indicated by the arrow 24. In order to enable adjustment of these directions with respect to each other and the Kerr cell, the prism 13 is mounted on a disk 25 arranged to rotate such as indicated by the arrow 26 to a desired position and thence be locked as by a set screw 27. Similarly, for the polarizer 21 there is provided a ring 28 arranged to be rotated as shown by the arrow 29 and locked in a desired position as by a set screw 30.

Figure 2:
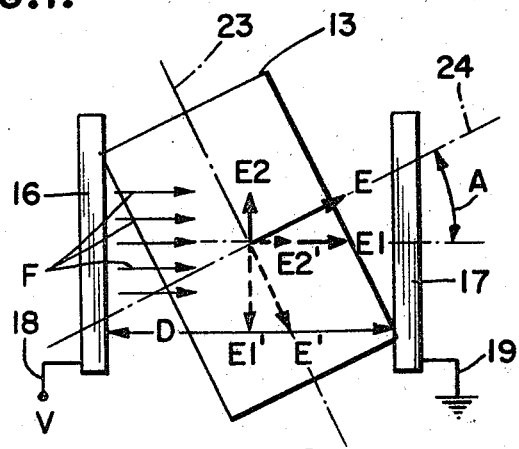
FIGURE 2 is a schematic diagram looking in the direction of the arrows 2—2 of FIGURE 1; and, FIGURE 3 is a view similar to FIGURE 2 showing a modified arrangement.

Referring now to FIGURE 2, radiation from the laser initially passing into the Kerr cell 15 is polarized by 21 in the direction of the line 24 hereinafter referred to as a given direction. This initial radiation is indicated by the vector E. The apex 23 of the roof prism 13 is oriented in a position perpendicular to the given direction of polarization 24. The direction of polarization 24, in turn, is oriented at an angle A to the direction of the electric field shown at F established between the plates 16 and 17 when a voltage is applied to the plates.

In operation, consider first the action of the retarder and roof prism when zero or no voltage is applied to the plates 16 and 17. In this event, the Kerr cell solution is isotropic so that all components of the incident radiation E will travel at the same speed through the solution. Because of the perpendicular orientation of the roof prism with respect to the given direction of polarization, the returning radiation from the roof prism will lie in the given direction of polarization 24 so that 100 percent transmission through the Kerr cell will result. It should be noted that while a 180° space rotation will occur in the roof prism when its apex is oriented perpendicularly to the given direction of polarization, there will be no attenuation in the polarizer 21 since the polarizer will pass radiation at either zero degrees or 180 degrees.

If now a voltage is applied to the plates of the Kerr cell 16 and 17, the cell solution is rendered anisotropic in such a manner that components of the incident radiation E are developed in directions parallel and normal to the direction of the electric field F, as shown at E1 and E2. These components however are at angles to the apex of the roof prism different from 90 degrees as determined by the angle A and will thus each, in turn, have components parallel and normal to the apex of the roof prism. These latter components will experience di-electric phase shifts in the roof prism depending on the angle A to result in elliptically polarized returning components. Further, the vector component E1 is retarded behind the vector component E2 in the Kerr cell by an amount determined by the value of the voltage V and the length of the cell L, shown in FIGURE 1.

The angle A and the voltage V are adjusted such that the returning components, each of which is a resultant of returning components parallel and normal to the roof prism, after passing back through the Kerr cell are in positions indicated at E1' for the returning component E1 and E2' for the returning component E2. The resultant of these two components is indicated by the vector E' which, it will be noted, is orthogonal to the original incident radiation vector E. Thus, this returning radiation will be completely attenuated in the polarizer 21 when the proper given angle A is provided and the proper given voltage is applied to the Kerr cell.

Figure 3:
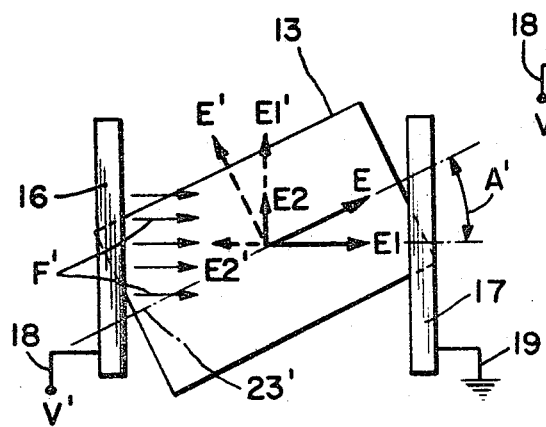

FIGURE 3 illustrates the vector positions when the apex 23 of the roof prism 13 is oriented parallel to the given direction of polarization of the electric vector E. In this case, the voltage applied to the Kerr cell plates, indicated V', is different from that in FIGURE 2 and is adjusted to a given voltage such that in conjunction with the angle A' between the vector E and a reference axis corresponding to the direction of the electric field F, the resultant vector E' of the returning electric components E1' and E2', is orthogonal to the given direction of polarization.

The equations relating the angle A to the phase shift contribution resulting from the di-electric total internal reflection by the roof prism, and the necessary retardation required in the Kerr cell to effect the desired maximum attenuation will now be described.

First, if it is assumed that the refractive index of the roof prism material is $n$, the phase shift introduced by using the prism when oriented perpendicular to the given direction of polarization will be 180 degrees plus a contribution P from the di-electric total internal reflection. This contribution P is given by:

$$\tan \frac{P}{4} = \sqrt{2}\sqrt{\frac{1}{2} - \frac{1}{n^2}}$$

The angle A between the direction of polarization and the reference axis which, for the Kerr cell corresponds to the direction of the electric field F, may be found from the equation:

$$\cos 2(90 - A) = \cos \frac{P}{2}$$

The retardation S required in one pass of the Kerr cell to effect compensation is then given by the equation:

$$\sin S = \frac{\sin \frac{P}{2}}{\sin 2(90 - A)} \quad 90 < S < 180$$

This is $S/90°$ as much retardation as required of a flat reflector.

It should be understood that a number of equivalent possible arrangements also exist. For example, the angle A could be either positive or negative since the Kerr cell is symmetrical above and below the field F. Similarly, the angle can be $A+90°$ and the polarization can end up at A when the Kerr cell is energized.

From the foregoing description, it will thus be evident that the present invention allows the use of a roof prism for a reflector while permitting complete Q switching or shuttering action to take place with only one power supply rather than two supplies as required heretofore. There thus results all of the various advantages set forth in the heretofore referred to co-pending application together with the added advantages of there being required only a single voltage to close the shutter, the shutter opening when zero or no voltage is supplied in a normal manner.

The specific embodiment described in this application has been in conjunction with a Kerr cell wherein the angle A is referenced to the direction of the electric field F. This direction corresponds to a reference axis in the Kerr cell constituting the direction of the major axis of a section of the index ellipsoid lying in the plane of the wave fronts of the light or radiation passing through the cell. (See chapter XIV, Principles of Optics by Born and Wolf; 2nd Revised Edition; the MacMillan Company, New York.) However, in the case of a Pockels cell, the direction of the electric field is normal to the plane of the wave fronts. Therefore, the term "reference axis" is used herein and in the following claims for purposes of referencing the angle A and is defined as said major axis of the section of the index ellipsoid lying in the plane of the radiation wave front.

What is claimed is:

1. A method of adjusting the phase relationship between initial radiation polarized in a given direction by a polarizing means and passing through an electro-optic retarder, and return radiation derived from said initial radiation passing back through said retarder after being totally internally reflected by a refracting medium and undergoing a phase shift in said refracting medium such that said return radiation is not attenuated in said polarizing means when zero voltage is applied to said retarder and attenuated in said polarizing means when a voltage is applied to said retarder, comprising the steps of: orienting said refracting medium in a given position relative to said given direction of polarization such that the phase shift of radiation components in said refracting medium causes said return radiation to be polarized along said given direction when zero voltage is applied to said retarder; orienting said given direction of polarization at an angle to a reference axis in said retarder; and adjusting said angle to a given angle and adjusting said voltage to a given voltage such that said given angle and given voltage result in said return radiation being polarized along a direction orthogonal to said given direction.

2. The method of claim 1, in which said refracting medium comprises a roof prism, said given position being such that the apex of said roof prism is perpendicular to said given direction of polarization.

3. The method of claim 1, in which said refracting medium comprises a roof prism, said given position being such that the apex of said roof prism is parallel to said given direction of said polarization.

4. An optical system comprising, in combination: polarizing means for polarizing initial radiation in a given direction; an electro-optical retarder positioned to receive initial radiation from said polarizing means and responsive to a voltage to effect a retardation of a component of said radiation in a direction parallel to a reference axis relative to a component normal to said reference axis; a refracting medium positioned to receive and totally internally reflect said initial radiation to provide return radiation back through said electro-optical retarder and polarizing means, said refracting medium being oriented in a given position relative to said given direction such that the phase shift in radiation components in said refracting medium causes said return radiation to be polarized along said given direction when zero voltage is applied to said electro-optical retarder; means for orienting said given direction of polarization at an angle to said reference axis; means for adjusting said angle to a given angle; and means for adjusting the voltage applied to said retarder to a given voltage, such that said return radiation is orthogonal to said given direction.

5. An optical system according to claim 4, in which said refracting medium comprises a roof prism, said given position being such that the apex of said roof prism is perpendicular to said given direction of polarization.

6. An optical system according to claim 4, in which said refracting medium comprises a roof prism, said given position being such that the apex of said roof prism is parallel to said given direction of polarization.

References Cited

UNITED STATES PATENTS

| 3,315,177 | 4/1967 | Benson | 331—94.5 |
| 3,356,438 | 12/1967 | Macek | 350—150 |
| 3,363,103 | 1/1968 | Fowler et al. | 350—150 |
| 3,373,376 | 3/1968 | Clark et al. | 350—150 |

DAVID SCHONBERG, Primary Examiner

PAUL R. MILLER, Assistant Examiner

U.S. Cl. X.R.

331—94.5; 332—7.51; 350—160